J. F. WALSH,

Assignor to G. LAUZ.

Cap for Horse-Collar.

No. 7,951. Reissued Nov. 13, 1877.

*Witnesses:*

Donn P. Twitchell.
Will N. Dodge.

*Inventor:*

James F. Walsh.
by Dodger & Son
Attys.

N. PETERS, PHOTO-LITHOGRAPHER, WASHINGTON, D. C.

UNITED STATES PATENT OFFICE.

JAMES F. WALSH, OF HAZEL GREEN, WISCONSIN, ASSIGNOR TO GEORGE LAUZ.

IMPROVEMENT IN CAPS FOR HORSE-COLLARS.

Specification forming part of Letters Patent No. 108,071, dated October 4, 1870; Reissue No. 7,951, dated November 13, 1877; application filed October 31, 1877.

*To all whom it may concern:*

Be it known that I, JAMES F. WALSH, of Hazel Green, in the county of Grant and State of Wisconsin, have invented certain new and useful Improvements in Caps for Horse-Collars; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

This invention relates to caps or pads for horse-collars; and the invention consists in making the cap or pad with an elastic plate of metal and a smooth leather lining, as hereinafter more fully set forth.

Figure 1:
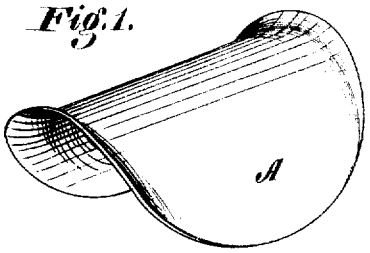
Figure 2:
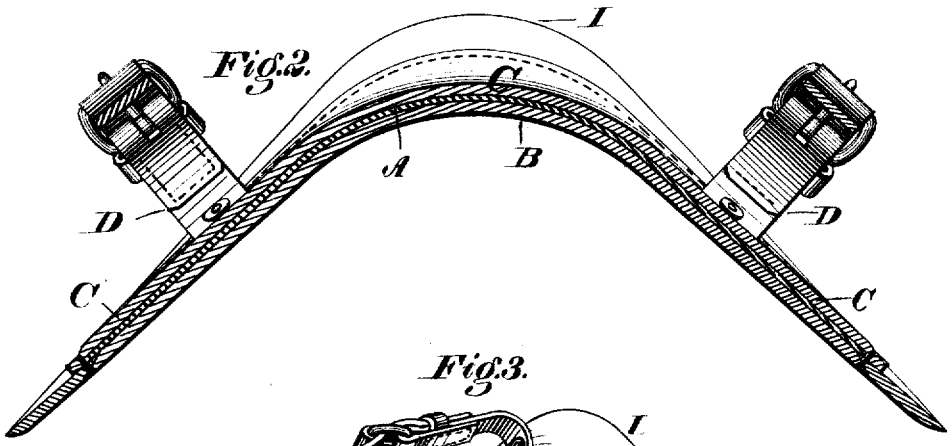

Figure 1 is a perspective view of the metal plate detached. Fig. 2 is a longitudinal vertical section, and Fig. 3 a perspective view, of a cap complete as made with my improvements embodied therein.

Heretofore this class of articles have usually been made of leather, stuffed with hair or some similar substance, thus forming a sort of cushion, and hence called a "pad," though sometimes they consisted of one or more thicknesses of leather, without any stuffing.

When thus made the leather was apt to wrinkle in use, thus making the surface which bears upon the animal's neck rough and irregular, and thereby the skin was liable to be abraded, thus making the neck sore, causing pain to the animal, and lessening its efficiency.

The object of the present invention is to overcome or remove these objections by producing a pad, or, as I prefer to term it, a "cap," which, while being elastic, shall also present and retain a smooth even surface in contact with the neck of the animal.

Figure 3:
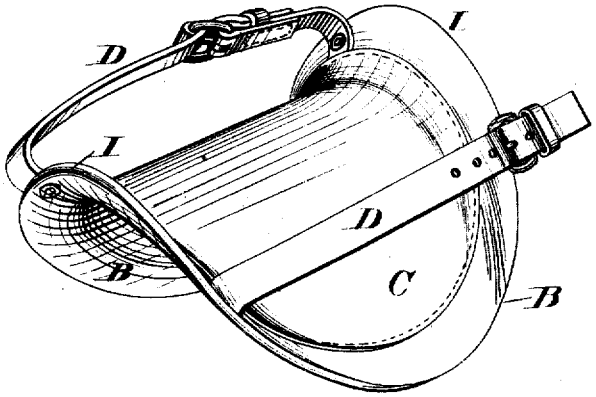

To accomplish these results, I take a plate of sheet metal, preferably having a considerable degree of elasticity, and bend it to the proper form, as represented in Fig. 1, to rest on the neck, and extending down the sides a short distance. To the under side or surface of this metal plate A is secured a sheet of leather, B, which is somewhat larger than the metal plate A, and is so arranged as to project more or less around the edge, thus forming a margin, I, as shown in Figs. 2 and 3. This margin I turn up at front and rear, as shown in Fig. 3, but at the sides it extends downward, as shown in Fig. 2, so as to fit under the collar.

The lining or leather sheet B is made of strong stiff leather, and should be secured to the metal plate in such a manner as to keep it smooth and prevent it from wrinkling, so that, in case of any movement or slipping of the cap and collar on the neck, it will slide over the skin and mane of the animal without injury, and so that, when resting on the neck, it will have a smooth and even bearing thereon, as it would not have if wrinkled, or if its surface was uneven and rough.

The metal plate A and the lining B may be fastened together in any suitable manner; but the plan which I prefer is shown in the drawings, and consists in stitching together two pieces of leather, the lining B and another piece, C, which latter is slightly larger than the metal plate A, and is placed over it, the stitching extending close around the edge of the plate, as shown by the dotted line on Fig. 3, the metal plate being thus held in position between the two pieces of leather, as shown in Fig. 2. Straps D are secured to the edges of the cap in the usual manner, for fastening it to the collar and keeping it in place when in use.

It will readily be seen that by this construction the metal plate preserves a smooth under surface at all times, rendering the cap much more easy to the animal than when made without the stiffening-plate, in which case they soon have creases and ridges formed in the under surface by the cramping and straining of the collar-straps and hames on the collar and caps.

By using an elastic metal plate the cap may be compressed or expanded to fit thick or thin necked animals, or to adapt it to the varying conditions of the same animal.

Having thus described my invention, what I claim is—

1. A cap for horse-collars consisting of a flexible metal plate with a smooth leather lining, substantially as described.

2. The combination of the flexible metal plate A and the smooth leather lining B, provided with the upturned edges I, substantially as set forth.

3. The combination of the leather lining B, the metal plate A, and the leather covering C, all united, substantially as shown and described.

JAMES F. WALSH.

Witnesses:
A. B. P. WOOD,
DANIEL BOWMAN.

Correction in Reissue Letters Patent No. 7,951.

It is hereby certified that the surname of the assignee in interest in these Letters Patent is erroneously written and printed "Lauz"; and that it should be *Lanz*, to agree with the assignment dated June 22, 1877, and duly recorded in the U. S. Patent Office, June 29, 1877, Liber A22, page 35.

April 20, 1880.